(No Model.)

F. W. BOWNE
TWO WHEELED VEHICLE.

No. 379,675. Patented Mar. 20, 1888.

WITNESSES:
W. R. Davis
C. Sedgwick

INVENTOR:
F. W. Bowne
BY Munn & Co
ATTORNEYS.

United States Patent Office.

FRANK W. BOWNE, OF LINCOLN, NEBRASKA.

TWO-WHEELED VEHICLE.

SPECIFICATION forming part of Letters Patent No. 379,675, dated March 20, 1888.

Application filed September 15, 1887. Serial No. 249,752. (No model.)

*To all whom it may concern:*

Be it known that I, FRANK W. BOWNE, of Lincoln, in the county of Lancaster and State of Nebraska, have invented a new and Improved Two-Wheeled Vehicle, of which the following is a full, clear, and exact description.

One of the greatest objections to the ordinary form of two wheeled vehicles is that the motion of the horse is imparted to the vehicle-body, and it is to overcome this objection and provide for the easy hanging of the body that I have devised the present system of mounting two-wheeled-vehicle bodies.

Reference is to be had to the accompanying drawings, forming a part of this specification, in which similar figures of reference indicate corresponding parts in all the views.

Figure 1:
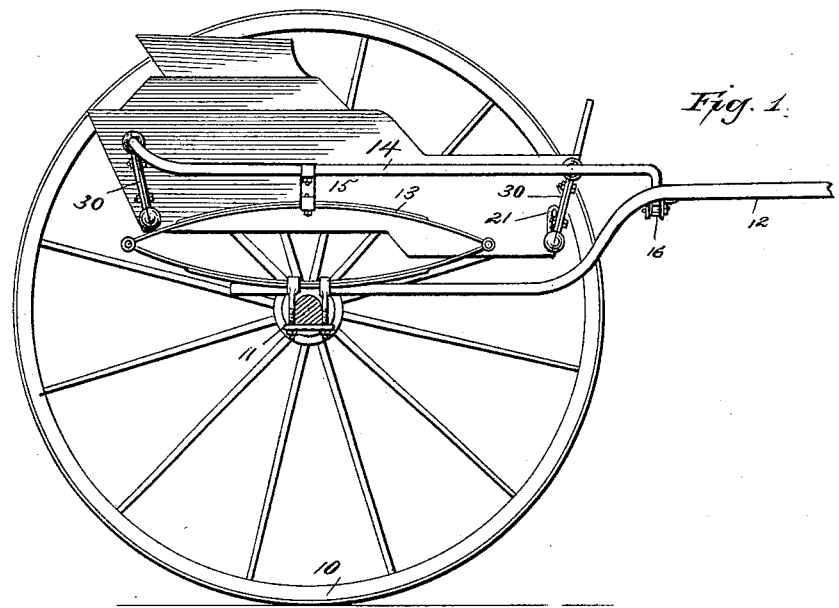
Figure 2:
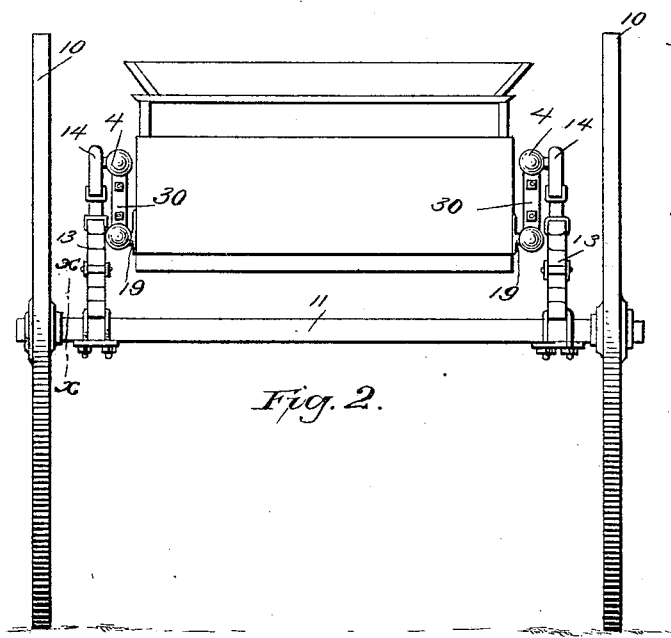
Figure 3:
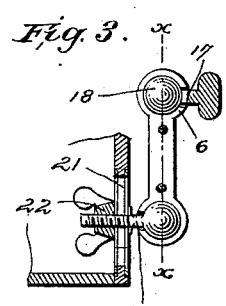

Figure 1 is a side view of a two-wheeled vehicle constructed in accordance with the terms of my invention, the right-hand wheel being removed and the axle being shown in section, taken on line *x x* of Fig. 2. Fig. 2 is a rear view of the vehicle. Fig. 3 is an enlarged sectional view illustrating the connection between one of the forward supporting-links and the vehicle-body, and Fig. 4 is a still further enlarged view taken on line *x x* of Fig. 3.

In the drawings above referred to, 10 represents the wheels; 11, the axle; 12, the shafts, which are connected to the axle in the usual well-known manner; and 13 are springs, also connected to the axle, said springs being preferably of the kind known in the trade as "elliptic" springs; but any other proper form of spring could be employed. The springs 13 support side bars, 14, said side bars being connected to the springs by clips 15, while the forward ends of the side bars are connected to the shafts by other clips, 16, or in any other desired manner.

To each of the side bars, 14, I connect two inwardly-extending studs, 17, that are formed with spherical heads 18, similar studs, 19, being connected to the rear end of the vehicle-body, while studs 20 are passed through slots 21, formed at the forward end of the vehicle-body, winged nuts 22 being arranged to engage the threaded shanks of the studs 20, as is shown in Fig. 3.

Figure 4:
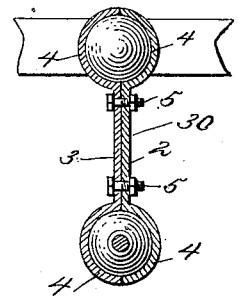

Upon each of the studs 17 I suspend a link, 30, that is made up of sections 2 and 3, these sections being formed with hollow semi-spherical end projections, 4, and the two sections being united by bolts 5, as best shown in Fig. 4, the upper projections 4 being arranged to inclose the spherical heads 18 of the studs 17, the projections being apertured, as shown at 6, to allow for the passage of the stud-shank 17.

The lower projections 4 of the sections forming the links 30 are arranged to inclose the spherical heads of the studs 19 and 20, the studs 20 being adjusted to a position such that the vehicle-body will rest in a horizontal line when the vehicle is attached to the horse, it being understood that unless some provision is made for the adjustment of the vehicle-body the angle of the body will vary with the height of the horse.

By suspending the vehicle-body in the manner above described I provide for the easy swinging of the body between the side bars, and although the motion of the horse may be imparted to the running-gear proper of the vehicle the inertia of the vehicle-body and of the weight carried thereby will tend to hold such body in a central position between the side bars.

Having thus fully described my invention, I claim as new and desire to secure by Letters Patent—

1. The combination, with a side bar provided with studs having spherical heads, of sectional links arranged for connection with said heads, and other heads also held by the links and arranged for connection with a vehicle-body, substantially as described.

2. The combination, with a vehicle-body having opposite slots in its sides near the forward ends, studs adjustable vertically in said slots, and studs at the rear ends of the sides, of the spring-supported side bars having inward-projecting studs at or near their front and rear ends, and links connecting said body and side-bar studs, substantially as set forth.

3. The combination, with a vehicle-body, of spring-suspended side bars, spherical-headed studs carried by the side bars, sectional links held upon the stud-heads, and other spherical-headed links connected to the side bars and engaged by the lower ends of the links, substantially as described.

4. The combination, with a vehicle-body, of side bars, spherical-headed studs carried thereby, sectional links engaging with the stud-heads, fixed spherical-headed studs secured at the rear of the vehicle-body and engaged by the rear links of the side bars, and other spherical-headed studs that are adjustably connected to the forward portion of the vehicle-body and engaged by the lower ends of the forward side-bar links, substantially as described.

FRANK W. BOWNE.

Witnesses:
A. McCORMICK,
J. H. SEIDELL.